United States Patent

[11] 3,586,447

| [72] | Inventor | David W. Vollmer |
| | | Brighton, N.Y. |
| [21] | Appl. No. | 825,356 |
| [22] | Filed | May 16, 1969 |
| [45] | Patented | June 22, 1971 |
| [73] | Assignee | Bausch & Lomb Incorporated |
| | | Rochester, N.Y. |

[54] SPLIT IMAGE MEASURING DEVICE FOR A MICROSCOPE
4 Claims, 4 Drawing Figs.

[52] U.S. Cl. .................................................. 356/163,
350/54, 350/81
[51] Int. Cl. .................................................. G01b 9/04
[50] Field of Search .................................... 356/156,
163; 350/23, 136, 81, 54

[56] References Cited
UNITED STATES PATENTS

| 1,564,418 | 12/1925 | Konig | 356/163 |
| 2,730,008 | 1/1956 | McGinn | 356/102 |
| 2,896,498 | 7/1959 | Brandon | 350/23 |
| 3,030,857 | 4/1962 | Shumway, Jr. | 350/23 |
| 3,068,743 | 12/1962 | Oyson | 356/163 |
| 3,288,021 | 11/1966 | Hopkins | 356/163 |

FOREIGN PATENTS

| 991,155 | 0/1951 | France | 356/163 |

Primary Examiner—Ronald L. Wibert
Assistant Examiner—J. Rothenberg
Attorney—Frank C. Parker ABSTRACT: An auxiliary device for microscopes whereby the image formed by the microscope objective is divided by beam dividers into two parts which form two split images which are movable for the purpose of measuring linear distances in the object plane of the microscope, and for measuring such distances along any meridian in said plane.

PATENTED JUN 22 1971

DAVID W. VOLLMER
*INVENTOR.*

BY Frank C. Parker

*ATTORNEY*

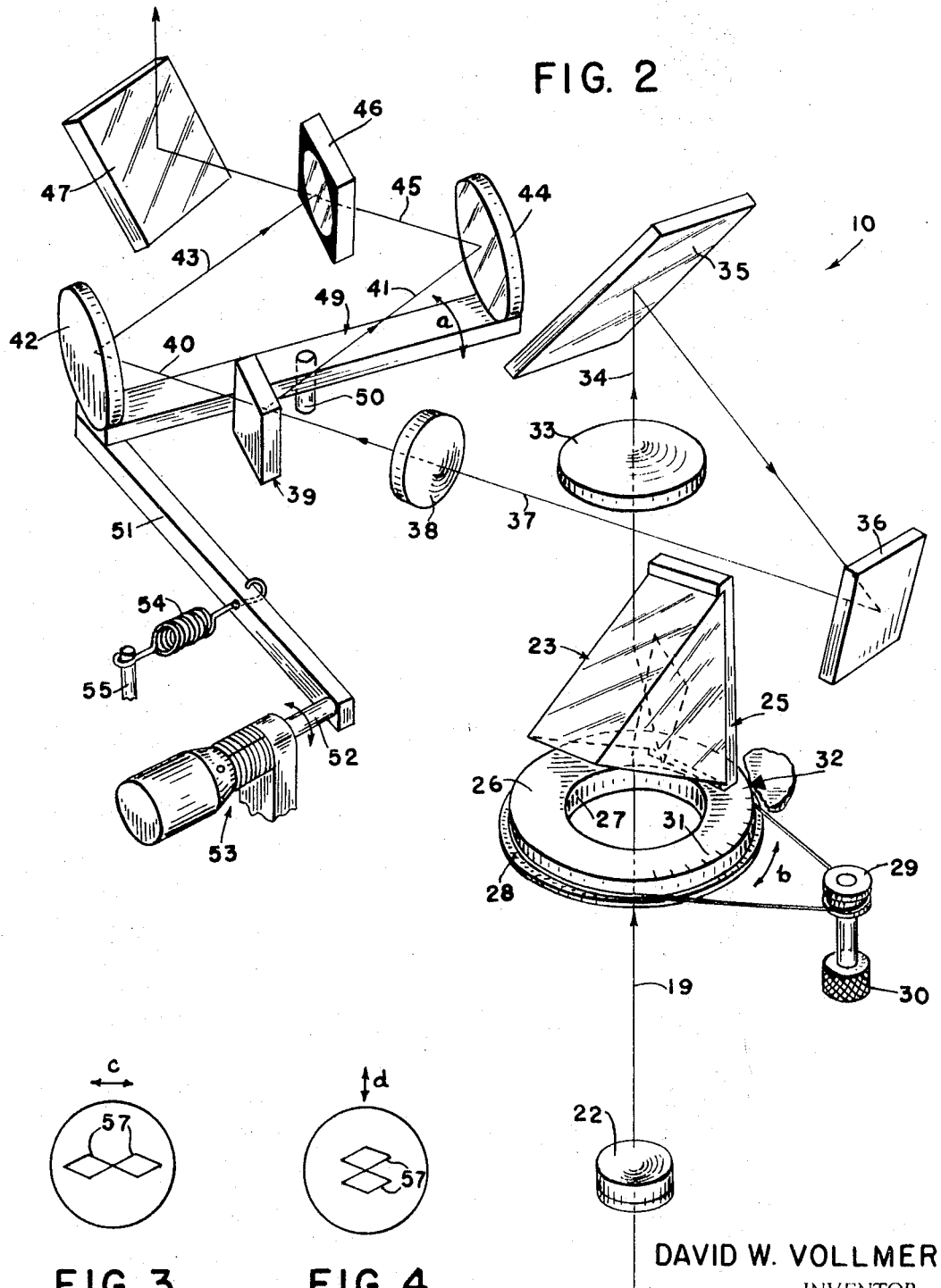

SPLIT IMAGE MEASURING DEVICE FOR A MICROSCOPE

BACKGROUND OF THE INVENTION

Microscopes generally have been used for critical measuring functions in the prior art using split images, the two companion images being moved relative to each other by indicated amounts so as to measure linear distances in the object plane of the instrument. In prior art devices, however, the measurement of the object is unidirectional which brings on limitations where any object plane as well as along a single linear axis.

SUMMARY OF THE INVENTION

The present invention relates to a measuring device for application to a variety of microscopes and the like and more particularly relates to the combinations and details of mechanism whereby transverse dimensions seen in the field of view may be determined.

It is an object of the present invention to provide a measurement device which may be applied to a variety of microscopes without substantial modification, said device being compact and sturdy and yet effective for producing precision dimensional readings in transverse directions in the object plane.

It is a further object of the invention to provide such a device whereby companion split images which are formed in the device may be rotated in the field of view to permit transverse dimensions to be attained accurately in any meridian in said field.

A still further object of the present invention is to provide such a device which can be conveniently constructed as an auxiliary demountable device which may be separately assembled and tested for adherance to optical and mechanical standards.

Further objects and advantages will be apparent in the details of construction and combination of parts by reference to the specification herebelow taken in connection with the accompanying drawings.

BRIEF DESCRIPTION OF THE DRAWINGS

FIG. 2 is a perspective and schematic view of the optical parts of the invention shown in one position of operation, FIG. 3 is a detail diagrammatic showing of the field of view of the instrument with the indicia for measuring shown in one position of operation, and FIG. 4 is a view similar to FIG. 3 showing said indicia in a second position of operation.

DESCRIPTION OF PREFERRED FORM OF THE INVENTION

Figure 1:
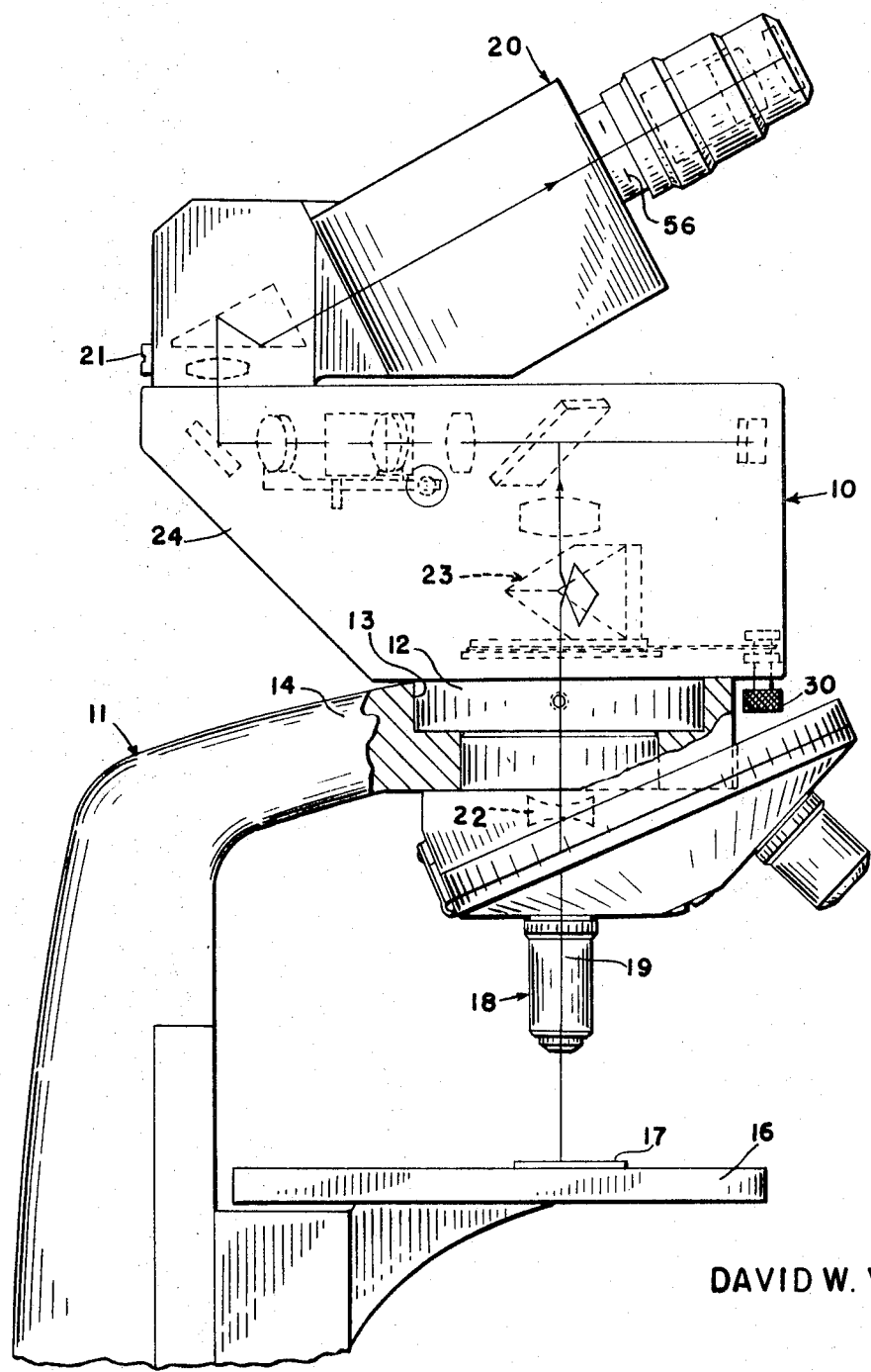
FIG. 1 is a side view of a microscope to which the split image measurement device is secured in one position of operation.

As shown in FIG. 1 of the drawings, the auxiliary measuring device is designated as a unit by numeral 10 and is shown applied to a microscope which is generally designated 11. The measuring unit 10 is secured on the microscope 11 by any means suited to the microscope such as for instance the boss 12 which is fitted into a counterbore 13 in the arm 14 and is held therein by a setscrew.

The microscope 11 is provided with the usual stage 16 whereon an object 17 is held for observation of its structure. An objective 18 located on the optical axis 19 of the instrument forms an image in the eyepiece focal plane 56 which is viewed by a conventional eyepiece numbered 20. Eyepiece assembly 20 is secured by any suitable connection not shown to the measuring unit 10 and may be locked thereon by means of a set screw 21. The objective lens system 18, used together with a negative lens 22, forms emergent parallel light rays.

According to the present invention, the auxiliary measuring device 10 is conceived to be a complete assembly per se which can be assembled and tested with respect to established standards of performance.

Said device 10 comprises a derotation prism 23 which is aligned on the optical axis 19 of the microscope 11 and said prism is suitably rotatably mounted in the casing 24 of the measuring device 10 for the purpose of obtaining transverse linear dimensions of an object in the field of view along a number of different meridians or directions. As schematically shown in FIG. 2, the derotation prism 23 is fixed onto a mounting member 25 having a ringlike base 26 having a wide aperture 27 therethrough. Mechanism of any desired form, not shown, may be provided for rotatably supporting the base 26 which has a sheave 28 formed thereon, said base being rotated by a much smaller pulley 29 which is suitably rotatably mounted in the casing 24. Connecting the pulley 29 and sheave 28 is a cord or other suitable drive connection whereby rotation of the pulley by the exterior knob 30 causes rotation of the prism 23. Arcuate scale means 31 is provided on the peripheral portion of the ring base 26 together with a suitable fixed index mark 32 to indicate the angular setting or position of the derotation prism 23.

Although the derotation prism 23 is shown in the drawings as being next in sequence to the lens 22 in the optical system, it may effectively be located at a subsequent position in parallel light if desired.

Next beyond the derotation prism 23 in the optical system is the front component of an afocal lens system, said component being the collective lens 33 which is located on the vertical optical axis portion 34. The axis of the optical system is folded by a first inclined mirror 35 aligned with the axis portion 34 and additionally by the second inclined mirror 36 which deflects the beam horizontally along axis portion 37.

On the horizontal axis portion 37 is aligned a second collective lens 38 which is the rear member of the aforesaid afocal lens system and is separated from lens 33 by the sum of the focal lengths of these lenses whereby parallel light rays emerge from lens 38 along axis 37. The afocal lens system is employed to eliminate or greatly reduce vignetting of the field of view.

Rearwardly along axis portion 37 is located a beam splitting apparatus consisting of a fixed beam divider 39 which is inclined across axis 37 and produces from the incident beam a transmitted beam 40 and a reflected beam 41. The transmitted beam 40 is incident on a movable inclined mirror 42 which reflects the beam along an axis portion 43 parallel to and coplanar with the reflected beam 41. Reflected beam 41 is incident on a second inclined and movable mirror 44 which deflects the beam along an axis portion 45 which is parallel to and coplanar with axis portion 40.

At the intersection of axis portions 43 and 45 a second fixed beam divider 46 is located to act somewhat as a beam uniting member which serves to direct the individual measuring beams in the general direction of axis portion 45. The two emergent beams are directed upwardly into the eyepiece assembly 20 by a deviation mirror 47.

Movement of the two movable mirrors 42 and 44 to vary their angular relationship to the fixed beam dividers 39 and 46 is obtained by mounting said movable mirrors on the opposite ends of a support bar 49 and the mirrors are moved in arcuate paths by pivoting the bar on a fixed axle 50. Means for turning the bar 49 on the pivot axle 50 are dependent on the degree of precision and convenience required but one form thereof is shown comprising a long operation lever 51 which is fixed onto the bar 49 and extends freely outwardly thereof. The free end of the lever 51 is yieldably held against the active spindle 52 of a micrometer 53 by a suitable extension spring 54 which is attached to the lever at one end and is attached at the other end to an anchor post 55.

In operating the measuring device 10, the image rays coming from the object 17 are projected by the objective lens system 18—22 parallel to the optical axis 19 through the rotation prism 23. Said rays are further projected through the afocal lens system 33—38 to the eyepiece focal plane 56 where a typical image or images 57 of the object are seen in the field of view by means of the eyepiece lens, said field appearing as shown in FIGS. 3 and 4.

In determining the size of an object 57 or particle, the mounting bar 49 is swung as indicated by the double-ended arrow "a" by turning the micrometer 53 until the split images coincide, the derotation prism 23 first being angularly positioned by the knob 30 to measure in the desired direction. A reading is indicated by the micrometer. Then the micrometer spindle 52 is again moved far enough to move the split images 57 apart as shown in FIG. 3 in the direction indicated by arrow "c" or as shown in FIG. 4 in the direction indicated by arrow "d" until their peripheries coincide and another reading is taken by the micrometer and it is compared with the first reading to determine the desired transverse dimension.

The use of a derotation prism 23 in the instrument greatly extends the usefulness and scope of the measurements since measurements may be secured in the manner described in any meridian or transverse direction of the field of view since the directions need not be normal to each other and therefore is adaptable to all object shapes.

Although only a preferred form of the invention has been shown and described herein, other forms are possible and changes and substitutions may be made in the combination and arrangement of the component parts thereof and in the detailed construction of said components without departing from the spirit of the invention as defined in the claims herebelow.

I claim:

1. A split image-type of measuring device for use on a microscope between the objective and eyepiece thereof comprising the combination of:
   a first beam divider optically aligned to receive the image beam from said objective and produce therefrom a reflected beam and a transmitted beam,
   a derotation prism optically aligned on the optical axis of said microscope between the objective and beam divider,
   rotatable mounting means for said prism for providing angular motion about said axis,
   means for rotating said mounting means,
   means operatively formed on said mounting means for indicating the amount of said angular motion,
   a first movable mirror optically aligned to receive said transmitted beam and deflect said beam parallel to the aforesaid reflected beam,
   a second movable mirror optically aligned to receive the aforesaid reflected beam and reflect it parallel to said transmitted beam,
   a second beam divider optically aligned to receive said reflected and transmitted beams and direct the emergent beams outwardly therefrom, said second beam divider being positioned substantially coplanar with said first beam divider and movable mirrors,
   means for directing said emergent beams into said eyepiece,
   a bar whereon said movable mirrors are fixed in spaced relation to each other,
   means for pivotally mounting said bar so as to swing the movable mirrors in the plane of the beam dividers to vary the distance between said beams, and
   means for measuring the arcuate movement of said bar.

2. A split image-type of measuring device for use on a microscope between the objective and eyepiece thereof comprising the combination of:
   a derotation prism optically aligned on the optical axis of said microscope between said objective and eyepiece,
   means for rotating said prism about said axis,
   means for indicating the amount of rotation of said prism,
   a fixed first beam divider optically aligned to receive the image beam from said prism and produce therefrom a reflected beam and a transmitted beam,
   an afocal aperture controlling optical system optically aligned between said prism and said beam divider, said system being composed of two similar positive lenses separated from each other by the sum of their focal lengths,
   a first movable mirror optically aligned to receive said transmitted beam and deflect said beam parallel to the aforesaid reflected beam,
   a second movable mirror optically aligned to receive and reflect the aforesaid reflected beam,
   a second fixed beam divider optically aligned to receive said reflected and transmitted beams and direct the emergent beams outwardly therefrom, said second beam divider being positioned substantially coplanar with said first beam divider and movable mirrors,
   means for directing said emergent beams into said eyepiece,
   a bar whereon said movable mirrors are fixed in spaced relation to each other,
   means for pivotally mounting said bar so as to swing the movable mirrors in the plane of the beam dividers to vary the distance between said beams, and
   means for measuring the arcuate movement of said bar.

3. In microscopes having means for measuring the sizes of objects and particles in the field of view thereof, of the kind wherein split images are measurably offset from a superimposed image view to a view wherein two images of a particle are seen tangent to one another, the improvement comprising:
   an image-rotation optical member rotatably mounted and aligned along the optical axis between the objective and the eyepiece of said microscope for rotating the axis of tangency of said images of a particle without the necessity of rotating the microscope stage.

4. A split image measuring device for use on a microscope between the objective and eyepiece thereof, comprising the combination of:
   a. an image-rotation optical member rotatably mounted and aligned along the optical axis of said microscope between said objective and said eyepiece;
   b. first and second beam dividers between said objective and said eyepiece for dividing and recombining, respectively, a light beam carrying the microscope image;
   c. first and second mirrors between said first and second beam dividers, said first mirror directing one of said divided image-carrying beams toward said second beam divider and said second mirror directing the other of said divided image-carrying beams toward said second beam divider, said mirrors being mounted as a unit on a pivotal member for controllably separating said divided image-carrying beams; and
   d. means drivably connected to said pivotal member for measurably displacing said pivotal member to separate said divided image-carrying beams.

UNITED STATES PATENT OFFICE
CERTIFICATE OF CORRECTION

Patent No. 3,586,447        Dated June 22, 1971

Inventor(s) DAVID W. VOLLMER

It is certified that error appears in the above-identified patent and that said Letters Patent are hereby corrected as shown below:

Column 1, line 12, before "plane" insert -- is to be measured in various meridians of the object --

Signed and sealed this 2nd day of November 1971.

(SEAL)
Attest:

EDWARD M. FLETCHER, JR.        ROBERT GOTTSCHALK
Attesting Officer        Acting Commissioner of Patents